United States Patent
Seidman

(10) Patent No.: US 7,974,717 B2
(45) Date of Patent: Jul. 5, 2011

(54) CUSTOMIZING SOUNDTRACKS

(75) Inventor: David I. Seidman, Passaic, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/623,080

(22) Filed: Nov. 20, 2009

(65) Prior Publication Data

US 2010/0067878 A1  Mar. 18, 2010

Related U.S. Application Data

(63) Continuation of application No. 11/444,865, filed on Jun. 1, 2006, now abandoned.

(51) Int. Cl.
*G06F 17/00* (2006.01)
(52) U.S. Cl. .......................................... 700/94; 381/119
(58) Field of Classification Search .................... 700/94; 386/96, 97, 98, 99; 381/119
See application file for complete search history.

(56) References Cited

U.S. PATENT DOCUMENTS

| | | |
|---|---|---|
| 5,838,873 A | 11/1998 | Blatter et al. |
| 5,902,115 A | 5/1999 | Katayama |
| 7,254,316 B2 | 8/2007 | Koshino et al. |
| 2001/0026679 A1 * | 10/2001 | Koshino et al. ............ 386/97 |
| 2004/0049780 A1 * | 3/2004 | Gee ......................... 725/32 |
| 2005/0105892 A1 | 5/2005 | Sugimura et al. |

* cited by examiner

*Primary Examiner* — Walter F Briney, III

(74) *Attorney, Agent, or Firm* — Scully, Scott, Murphy & Presser, P.C.; Daniel P. Morris, Esq.

(57) ABSTRACT

A system and method for replacing all or part of the original audio of a digital program with other audio enables a user to customize a digital program soundtrack. The method includes receiving the audio portion of the digital program as an audio data stream including multiplexed associated audio and data packets, selecting at least one of the audio packets to be replaced by a replacement audio packet, and replacing the at least one of the audio packets with a replacement audio packet thereby customizing the audio portion of the digital program during program playback. The method also enables customizing an audio portion of a transmitted analog program. The method includes receiving first and second audio signals, receiving information transmitted in a vertical blanking interval of the transmitted analog program, interpreting the information and removing a replaceable audio signal, and replacing the replaceable audio signal with a user-selected audio signal.

18 Claims, 7 Drawing Sheets

FIG. 3

| 300 | |
|---|---|
| START TIME | 305 |
| END TIME | 310 |
| AUDIO PID | 315 |
| NO. PACKETS | 320 |
| VOLUME | 325 |
| PITCH | 330 |
| TEMPO | 335 |
| GENRE | 340 |
| INSTRUMENTAL WITH LYRICS | 345 |
| BEHIND DIALOGUE | 350 |
| SCENE CHARACTERIZATION | 355 |

FIG. 4

| 400 | |
|---|---|
| START TIME | 405 |
| END TIME | 410 |
| REPLACEMENT AUDIO PID | 415 |
| ADDRESSES OF REPLACEMENT CONTENT IN THE REPLACEMENT AUDIO BUFFER | 420 |
| DEVICE WHERE REPLACEMENT AUDIO IS STORED | 425 |

| PID | CONTENT |
|---|---|
| 1001 | VIDEO |
| 2001 | AUDIO 1 - DIALOGUE |
| 2002 | AUDIO 2 - EFFECTS |
| 2003 | AUDIO 3 - MUSIC |
| 3001 | DATA - AUDIO CHARACTERISTIC TABLE |

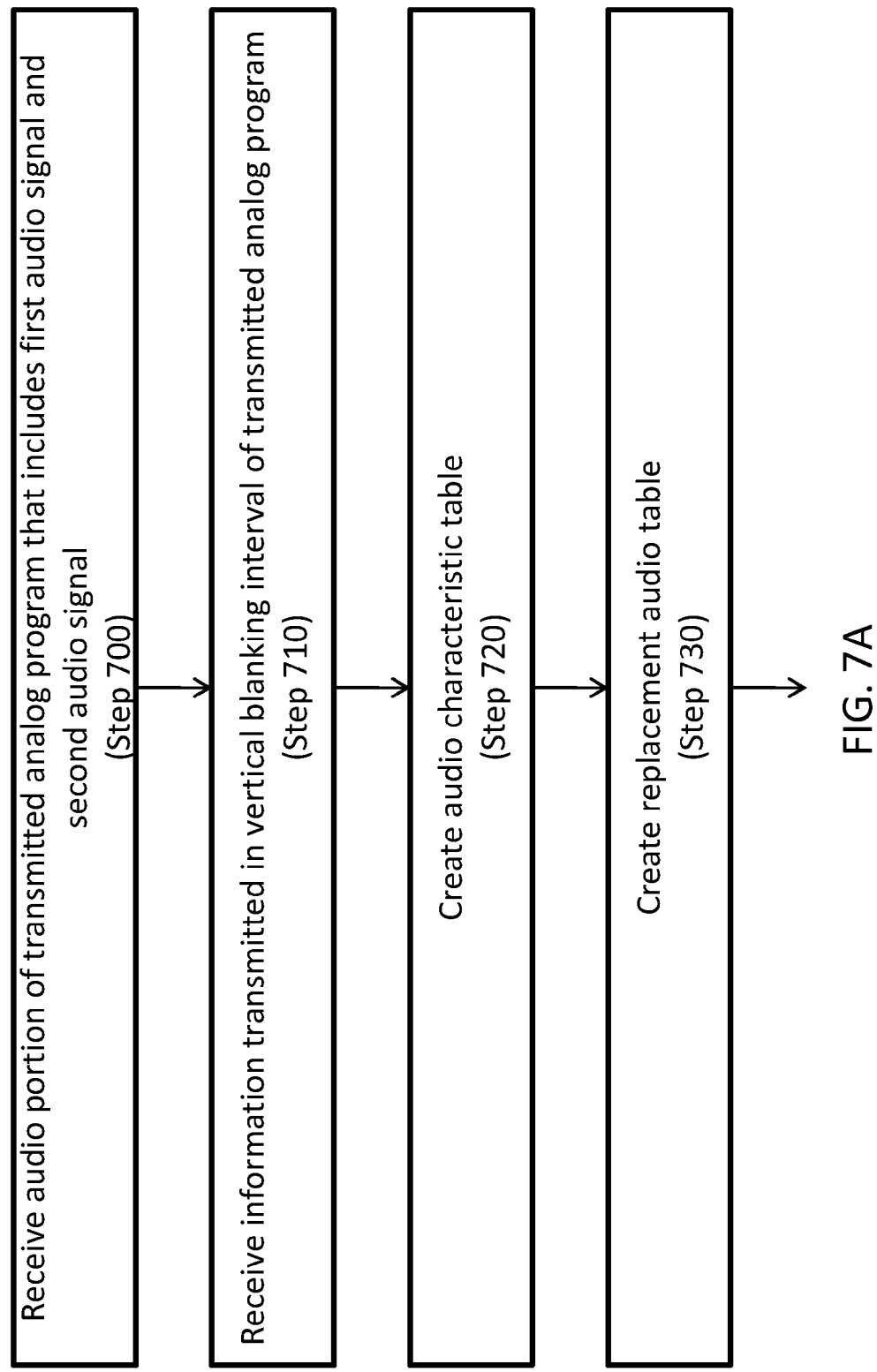

CUSTOMIZING SOUNDTRACKS

RELATED APPLICATION

This application is a continuation of U.S. patent application Ser. No. 11/444,865, filed on Jun. 1, 2006 the entire content and disclosure of which is incorporated herein by reference.

FIELD OF THE INVENTION

The invention relates generally to the field of home entertainment systems, and more particularly to a system and method for enhancing and customizing playback of soundtracks.

BACKGROUND INFORMATION

Currently, broadcast video, video cassette recorders, and digital video disk (DVD) players limit a user's input to a standard set of functions, which includes play, pause, and stop, for example. Some DVDs also include, on an extended soundtrack disk, additional songs that were not part of the original movie soundtrack. However, there does not exist a system for replacing the prerecorded audio portion of a digital or analog program or presentation with music from an extended soundtrack or music from another source during movie playback in home entertainment systems.

A typical Digital Video Disc (DVD) format includes MPEG-2 video/audio encoding. In MPEG-2 encoding, video and audio are separated into different streams (identified by distinct program identifiers (PIDs) in the header of each MPEG-2 packet). It would be highly desirable to provide a system and method for home entertainment systems that removes or replaces a program's prerecorded audio soundtrack, with other audio, e.g., music, that is customized for the viewer.

SUMMARY OF THE INVENTION

The invention relates generally to the field of home entertainment systems, and more particularly to a system and method for enhancing playback of soundtracks in analog or digital programs, such as broadcast television (digital or analog), or prerecorded analog or digital movies. The present invention involves a method and apparatus for replacing all or part of a program's prerecorded audio soundtrack (e.g., music that is played by default) with other audio that is customized for, or by, the viewer.

In one aspect, the invention involves a method for customizing an audio portion of a digital program. The method includes receiving the audio portion of the digital program as an audio data stream including multiplexed associated audio and data packets, selecting at least one of the audio packets to be replaced by replacement audio packet, and replacing the audio packets with a replacement audio packet and thereby customizing the audio portion of the digital program during program playback.

In one embodiment, the method includes storing the plurality of audio packets in an audio buffer. In another embodiment, the method includes storing the replacement audio packet in a replacement audio buffer. In still another embodiment, the method includes creating an audio characteristics table based on information from the data packet associated with the at least one of the plurality of data packets. In yet another embodiment, the method includes creating a replacement audio table that includes information corresponding to the replacement audio packet. In other embodiments, selecting at least one of the audio packets to be replaced includes determining an audio packet program identifier from a program specific information table for the at least one of the audio packets to be replaced, and storing the audio program identifier in an audio characteristic table. In another embodiment, the method includes identifying during playback of the digital video the at least one of the audio packets to be replaced by reading an audio program identifier from a header in the associated data packet. In still another embodiment, the method includes consulting the audio characteristics table and modifying the audio characteristics of the replacement audio packet to match the audio characteristics of the at least one of the audio packets. In yet another embodiment, replacing the at least one of the audio packets with the replacement audio packet includes retrieving the replacement audio packet from the replacement audio buffer and multiplexing the replacement audio packet with the audio data stream. In still another embodiment, the method includes retrieving the replacement audio packet from a DVD or CD. In other embodiments, the method includes demultiplexing the data stream to separate the plurality of associated audio and data packets.

In another aspect, the invention involves a system for customizing an audio portion of a digital program. The system includes a means for receiving the audio portion of the digital program as an audio data stream that includes multiplexed associated audio and data packets. The system further includes a graphical user interface for selecting at least one of the audio packets to be replaced by replacement audio packets, and a control system for replacing the at least one of the audio packets with a replacement audio packet and thereby customizing the audio portion of the digital video during program playback.

In one embodiment, the control system includes random access memory and an audio processor. In another embodiment, the system includes a data storage means for storing the audio packets. In still another embodiment, the system includes a data storage means for storing the replacement audio packet. In yet another embodiment, the system includes a demultiplexing means for demultiplexing the data stream to separate the associated audio and data packets.

In still another aspect, the invention involves a program storage device readable by a machine, tangibly embodying a program of instructions executable by the machine to perform method steps for customizing an audio portion of a digital program. The method steps include receiving the audio portion of the digital video as an audio data stream that includes multiplexed associated audio and data packets, selecting at least one of the audio packets to be replaced by replacement audio packet, and replacing the at least one of the audio packets with a replacement audio packet thereby customizing the audio portion of the digital program during program playback.

In yet another aspect, the invention involves a method for customizing an audio portion of a transmitted analog program. The method includes receiving the audio portion of the transmitted analog program. The audio portion includes a first audio signal and a second audio signal. The method further includes receiving information transmitted in a vertical blanking interval of the transmitted analog program. The information includes which of the first audio signal and the second audio signal is replaceable and the replaceable audio signal's characteristics. The method still further includes interpreting the information and removing the replaceable audio signal, and replacing the replaceable audio signal with a user-selected audio signal.

In one embodiment the method further includes mixing the user-selected audio signal with the remaining first or second audio signal and transmitting the mixed user-selected audio signal and remaining first or second audio signal to a speaker.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 3 is an illustrative example of entries in an audio characteristics table, according to one embodiment of the invention.

FIG. 4 is an illustrative example of entries in a replacement audio table, according to one embodiment of the invention.

FIG. 5 is an illustrative example of a program specific information (PSI) table, according to one embodiment of the invention.

DESCRIPTION

The present invention involves a method and apparatus for replacing all or part of an audio soundtrack (e.g., music that is played by default) with other audio that is customized for, or by, the viewer.

Digital video disks (DVDs) include digital information formatted with MPEG-2 encoding. In MPEG-2 encoding, video data and audio data are separated into different data streams. In the present invention, DVD audio information is encoded such that the musical track is separated from the rest of the audio soundtrack, so that the music, which is prerecorded with video (and is played by default), can be replaced with other music, and thus customized for, or by, the viewer.

Figure 1:
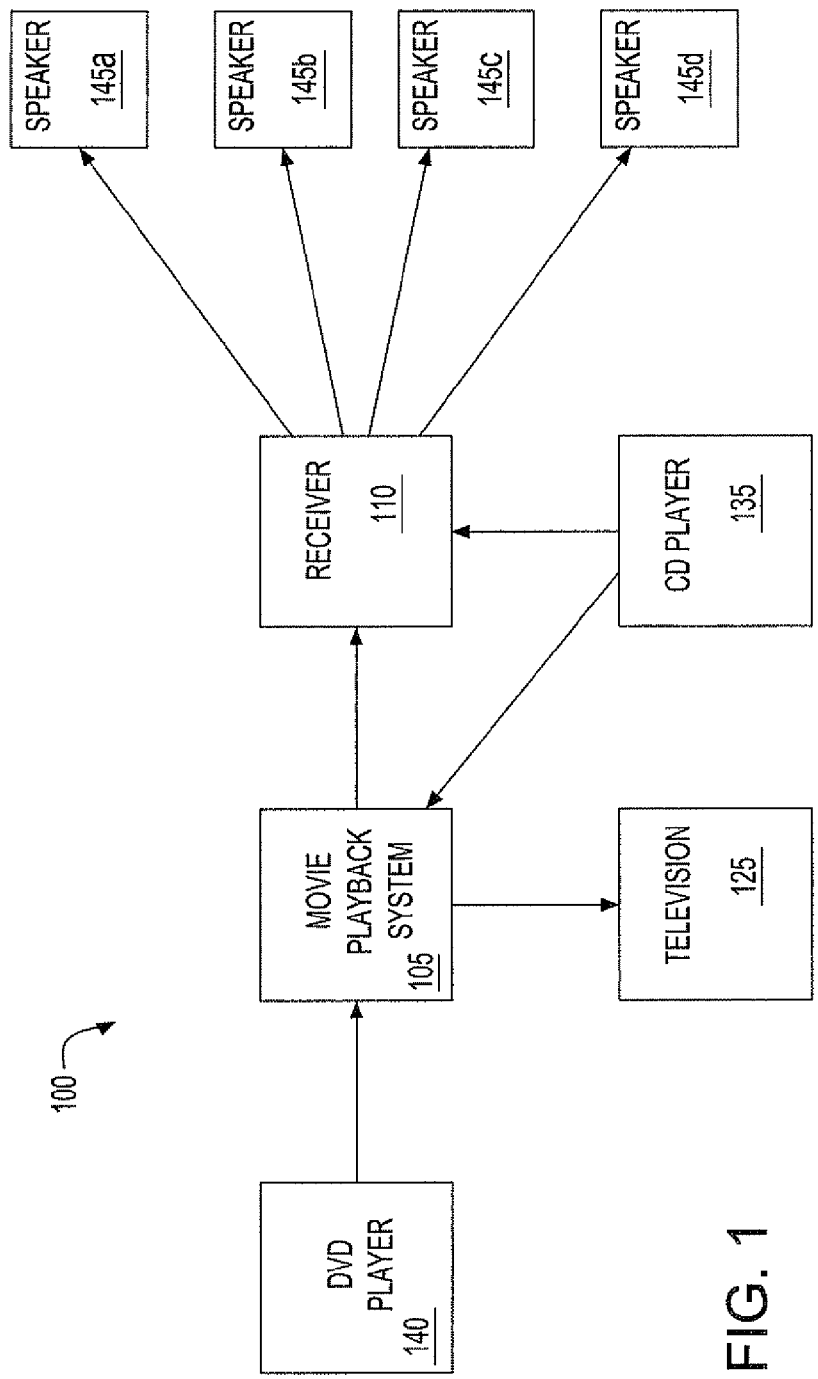
FIG. 1 is an illustrative block diagram of a home entertainment system including a movie playback system, according to one embodiment of the invention.

Referring to FIG. 1, in one embodiment, a block diagram of a home entertainment system 100 is shown. The home entertainment system 100 includes a receiver 110, a DVD player 140, a CD player 135, a television 125, four speakers 145a-d, and a movie playback system 105. In other embodiments, other components can be included, such as a CD Juke box, a cable box, or an MP3 player, etc.

Figure 2:
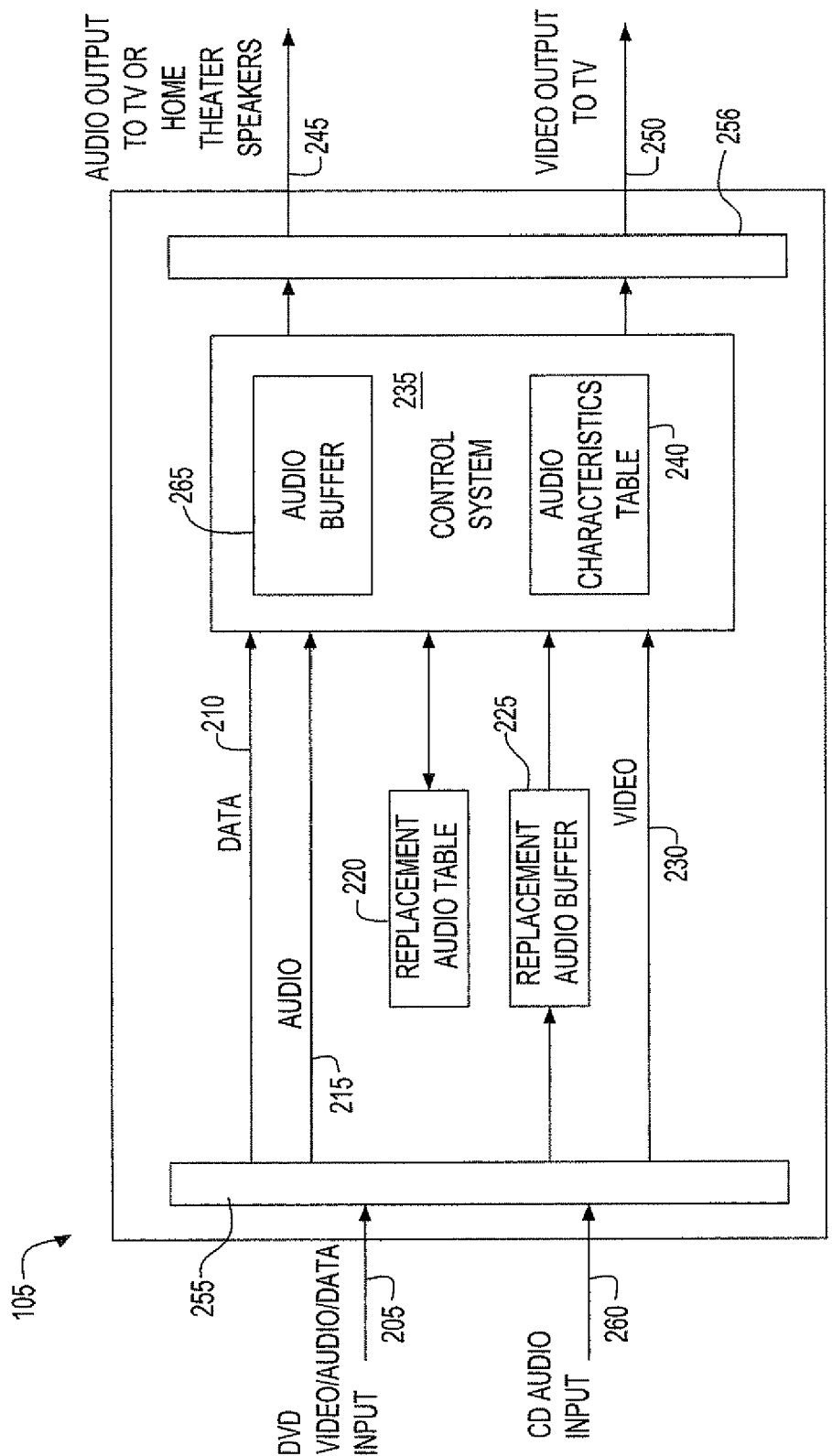
FIG. 2 is an illustrative block diagram of the movie playback system shown in FIG. 1.

Referring to FIG. 2, in one embodiment, a block diagram of the movie playback system 105 is shown. The system 105 includes a receiver interface 255 for receiving a DVD digital audio/video signal 205 (from the digital video disk player 140, for example), and a separate CD audio signal input 260 (from the compact disk player 135, for example). In various embodiments, the receiver interface 255 includes various input connectors for connecting to, and receiving signals from the DVD player 140, CD player 135, or other digital media players, such as an MP3 player. For example, the connectors can include, banana plug connectors, S-video connectors, BNC connectors, RCA connectors, optical connectors (couplers), or other connectors suitable for audio/video signals. The system 105 also includes an output signal interface 256, which includes connectors for connecting video signal 250 with a video display, such as a monitor or the television 125, and connectors for connecting audio signals 245 output from the system with the television 125 or the receiver 110 of the home entertainment system 100.

The system 105 further includes a control system 235, which includes an audio characteristics table 300, and a memory storage device for temporarily storing (buffering) audio signal data (i.e., audio buffer 265). In some embodiments, the control system 235 includes an audio processor, which can be a microprocessor or an ASIC.

The system 105 still further includes a replacement audio table 220 for storing replacement audio characteristics, and a replacement audio buffer 225 for storing replacement audio, both of which are in communication with the control system 235. In one embodiment, the replacement audio table 220 and the replacement audio buffer 225 reside in a separate memory (e.g. RAM). In another embodiment, the replacement audio table 220 and the replacement audio buffer 225 reside in memory on the control system 235.

The receiver interface 255 communicates or provides digital audio 225 (multiplexed music audio and other (dialog, sound effects, etc.) audio signals or segments), digital data 210, and digital video 230 to the control system 235.

The movie playback system 105 further includes a front key panel (not shown), which enables a user to configure and control the system 105. In another embodiment, the movie playback system 105 includes, and can be configured and controlled by, an infrared remote control and on-screen menus.

As previously discussed, the system 105 replaces segments of audio content (MPEG-2 audio packets) from an audio/video presentation being played from the DVD player 140 with replacement audio content (segments). The replacement content may (replacement MPEG-2 audio packets) come from a music CD playing on the CD player 135, or an MP3 player, or from a separate audio track on the DVD. In another embodiment, music from the CD player 135 or an MP3 player can be stored on the DVD player 140, if the DVD player 140 has sufficient memory.

The system 105 includes a graphical user interface (GUI), which is displayed on the television 125, by the control system 235, during system 105 configuration. The GUI functions and appears similar to a GUI displayed on a television by a typical VCR, DVD player, or cable set-top box, and is known to those skilled in the art. During normal viewing, the video signal 230 passes through the control system 235 to the video output 250. During configuration, the GUI is temporarily displayed by the control system 235 in place of the video via the video output 250. After configuration is completed, the digital video signal 230 again passes through the control system 235 to the video output 250.

Prior to playing the presentation (e.g. digital movie), via the GUI, the user is first directed to select the audio content (audio segments of the movie) that is to be replaced. Then the user is directed (by the GUI) to select for each of the selected audio segments of the presentation, the music (replacement audio segments) that he or she would like to have playing in the background of the presentation. For example, the user can choose to change the soundtrack to an entire movie, or the user can change the music for one or more particular scenes of the movie. The user selects the source of the replacement audio content (CD, MP3, DVD, for example), and then selects the particular tracks that are to replace the default (original) audio content.

Referring to FIG. 3, in one embodiment, the control system 235 produces an audio characteristics table 300, which is not seen by the user, for the audio segments that are to be replaced. The audio characteristics table 300 includes such entries as start time of an audio segment 305, end time of an audio segment 310, audio program identifiers (PID) 315, number of MPEG-2 packets 320, recommended volume 325, recommended pitch 330, recommended tempo 335, genre 340, whether the audio segment is an instrumental piece or music with lyrics 345, whether the audio segment is music alone or music behind dialogue 350, and a description of the type of scene 355 so the proper audio can be added. The audio PID resides in the header of each MPEG-2 packet and is used to identify the particular MPEG-2 packet. The information used in the audio characteristics table 300 can come from the MPEG data stream 210 or from data areas of the existing musical track headers in the audio stream 215.

Referring to FIG. 4, in one embodiment, after the user has selected the replacement audio segments (replacement MPEG-2 audio packets), the control system 235 produces a replacement audio table 400, which indicates the audio content from the CD, from another medium, or from another device, that is to be used to replace the selected audio content of the DVD. The replacement audio table 400 includes such entries as start time of the replacement audio segment 405, end time of the replacement audio segment 410, replacement audio PID (the same PID as the audio segment to be replaced) 415, a memory address 420 of the replacement audio segment in the replacement audio buffer 225, and the device where the replacement audio is stored 425. The selected replacement audio segments are stored in the replacement audio buffer 225. The replacement audio segments are identified by their start and end times. Each start/end time is known as a replacement interval.

Referring to FIG. 5, in one embodiment, a program-specific information (PSI) table 500 is shown. The PSI table 500, which resides on the DVD to be played, is an MPEG-2 construct which serves as a directory 510 of the PIDs program identifiers (PIDs) 505 of the MPEG-2 packets in the original multiplexed audio stream. When the user initially selects a particular audio segment to be replaced, the corresponding PID of the particular audio segment is stored in the audio characteristics table 300. The information that characterizes the particular audio segment is later retrieved from the MPEG-2 data stream 210 or from the data areas of the existing musical track headers of the particular audio segment in the audio stream 215 during playback.

In real time, during playback of the presentation (e.g. movie), the system 105 uses the information in the PSI table 500, the audio characteristics table 300, and the audio replacement table 400 to remove the audio segment (audio packets) to be replaced by demultiplexing out the particular audio segment (identified by the audio segment PID) from the multiplexed audio stream. The replacement audio segment (with the same PID as the original audio segment) from the CD is then multiplexed into the multiplexed audio stream in place of the original audio segment.

Figure 6:
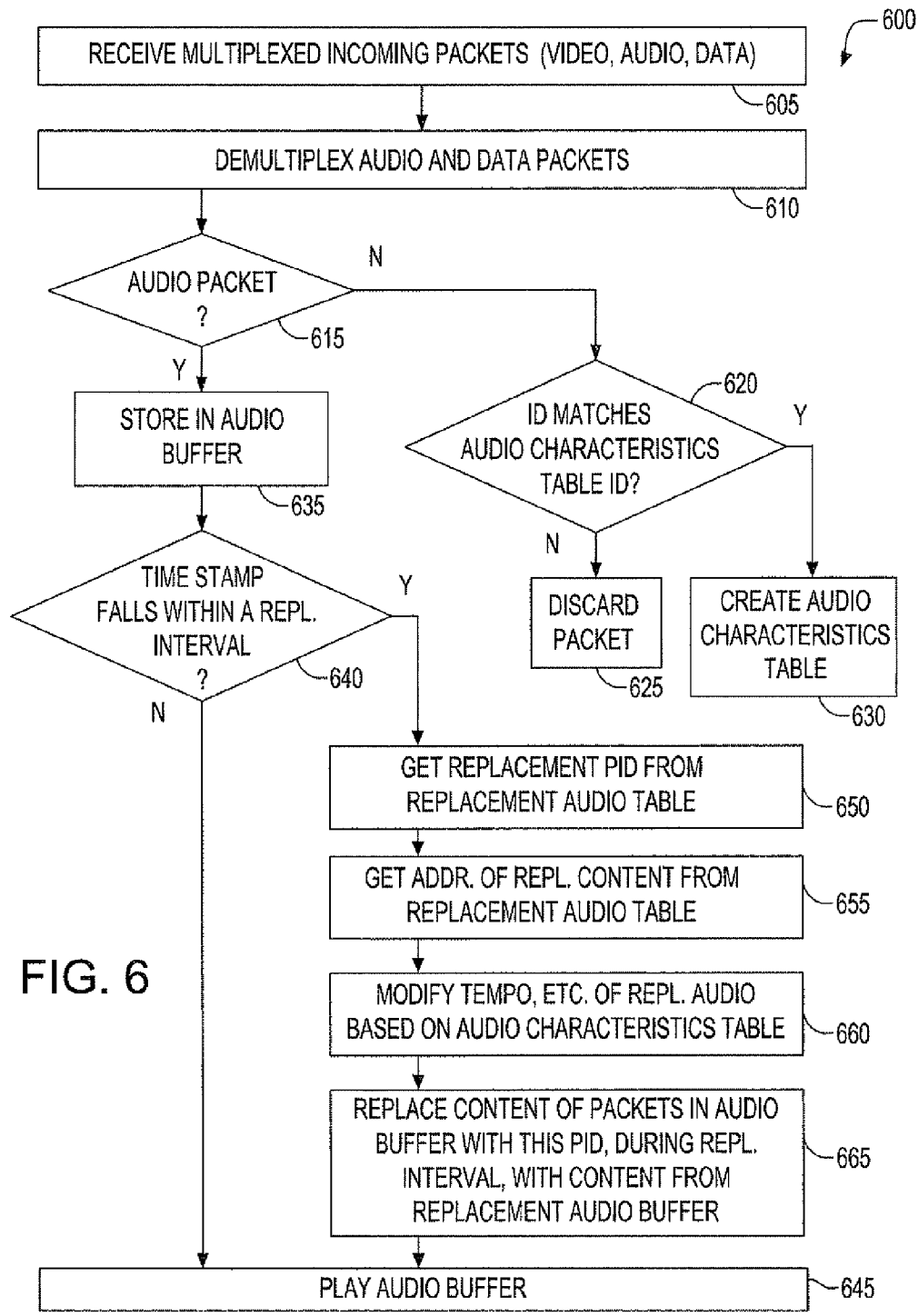
FIG. 6 is an illustrative flowchart of an audio replacement process according to one embodiment of the invention.

Referring to FIG. 6, in one embodiment, a flowchart of the replacement process is shown. The control system 235 first receives the multiplexed MPEG-2 packets (Step 605). The control system 235 then demultiplexer the MPEG-2 audio and data packets (Step 610). The control system 235 then determines if a particular packet is a data packet or an audio packet (Step 615). If the packet is a data packet, the control system determines if PID of the data packet matches a PID in the audio characteristics table 300 (Step 620). If the PID of the data packet does not match a PID in the audio characteristics table 300, the packet is discarded (Step 625). If the PID of the data packet does match a PID in the audio characteristics table 300, the data is used create the audio characterizing entries in the audio characteristic table 300 for the corresponding audio segment (Step 630).

If the packet is an audio packet, then the audio packet is stored in the audio buffer 265 (Step 635). The control system 235 then determines if the audio packet timestamp (point within the movie playback) coincides within a replacement interval specified in the replacement audio table 400 (time period previously selected by the user for replacement with another audio segment) (Step 640). Since there may be multiple audio streams during an interval (e.g. one for dialogue and another for background music), the replacement audio table 400 is consulted to determine which stream (as identified by its PID) is to be replaced. If the audio packet timestamp does not coincide within a particular replacement interval, the audio packet in the audio buffer 265 is played (Step 645). If the audio packet timestamp does coincide within a particular replacement interval specified in the replacement audio table 400, the replacement PID is retrieved from the replacement audio table 400 (Step 650). Next, the address of replacement audio segment in the replacement audio buffer 225 is retrieved from the replacement audio table 400 (Step 655). Thereafter, the replacement audio segment is retrieved from the replacement audio buffer 225 and modified according to the parameters in the audio characteristics table 300 (Step 660). The contents of the original (to be replaced) packets in the audio buffer 265 are then replaced with the replacement audio segment (audio packets with the same PID and time interval) that was stored in the replacement audio buffer 225 (Step 665). The contents of the audio buffer 265 are then played as if it was the original audio segment (Step 645).

Figure 7B:
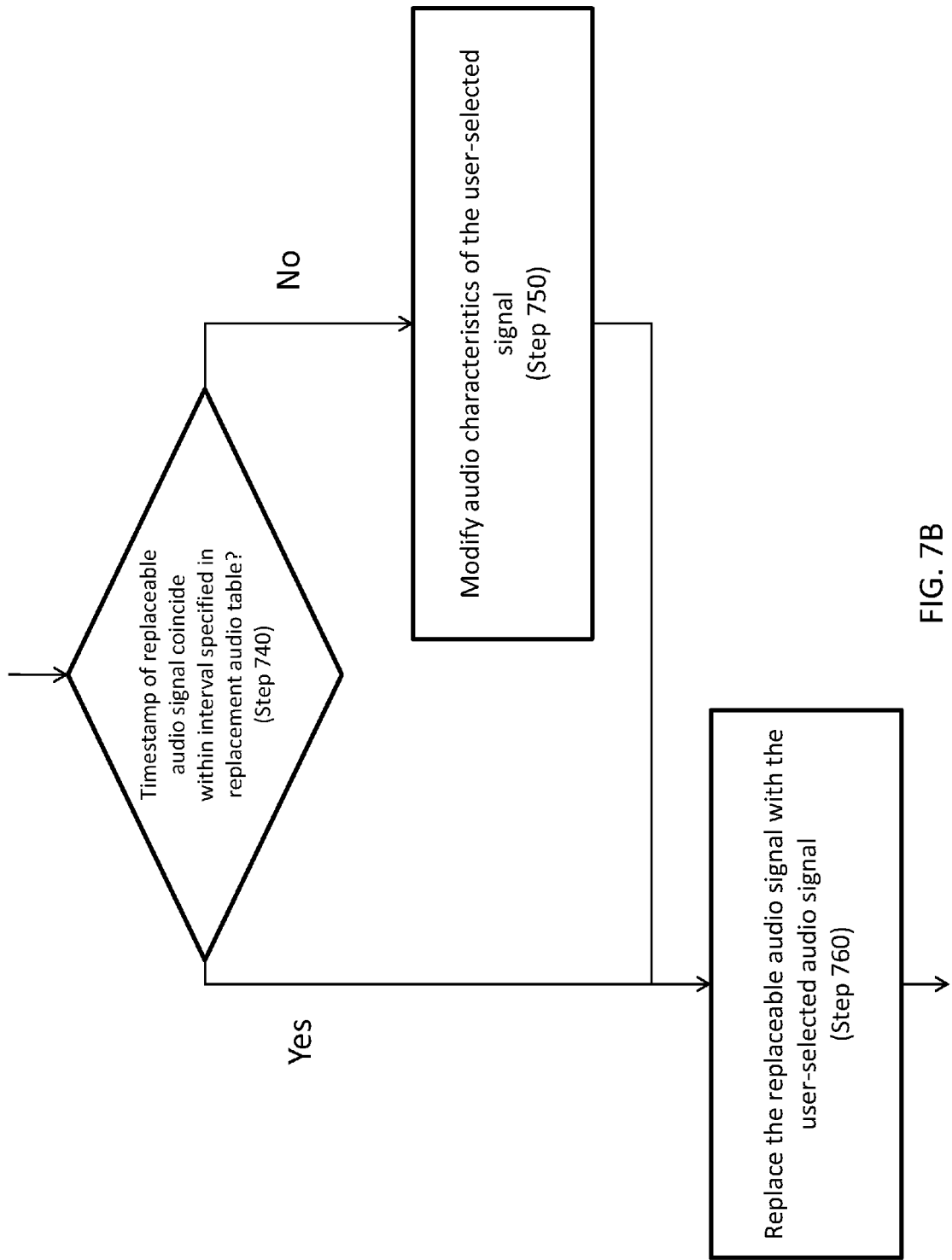
FIGS. 7A-7B illustrate a flow chart that describes method steps for customizing an audio portion of a transmitted analog program according to one embodiment of the invention.
Figure 7C:
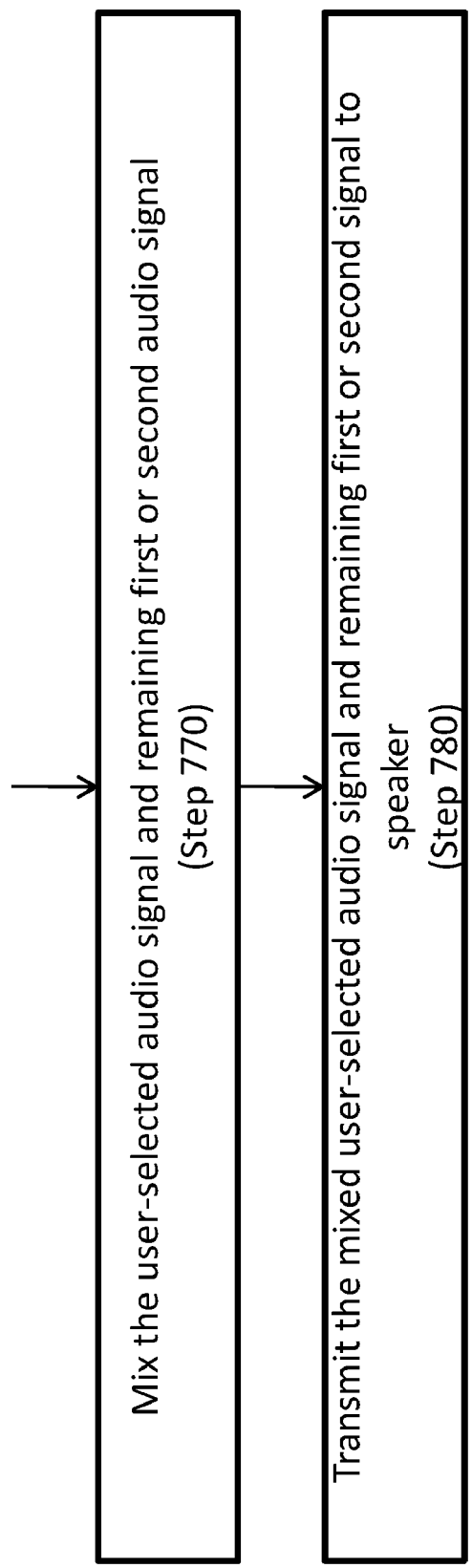

In one embodiment, FIGS. 7A-7C illustrate a flow chart that describes method steps for customizing an audio portion of a transmitted analog program. At step 700, the system 105 receives the audio portion of the transmitted analog program. The audio portion includes a first audio signal and a second audio signal. At step 710, the system 710, the system receives information transmitted in a vertical blanking interval of the transmitted analog program. The transmitted information includes, but is not limited to: which of the first audio signal and the second audio signal is replaceable and the replaceable audio signal's characteristics. At step 720, the system 105 creates an audio characteristics table for storing audio characteristics based on the received infoimation corresponding to the replaceable audio signal. At step 730, the system 105 creates a replacement audio table comprising information corresponding to a user-selected audio signal.

At step 740, the system 105 determines, in real time, whether a timestamp of said replaceable audio signal coincides within an interval specified in said replacement audio table. If the timestamp coincides within the interval specified in the replacement audio table, at step 760, the system 105 replaces the replaceable audio signal with the user-selected audio signal. Otherwise, at step 750, the system 105 modifies audio characteristics of the user-selected audio signal to match the audio characteristics of the replaceable audio signal according to the audio characteristic table. Then, at step 760, the system 105 replaces the replaceable audio signal with the user-selected audio signal. At step 770, the system 105 mixes the user-selected audio signal with the remaining first or second audio signal. At step 780, the system 105 transmits the mixed user-selected audio signal and remaining first or second audio signal to a speaker.

In another embodiment, the present invention involves a method and apparatus for replacing all or part of an analog video's prerecorded audio soundtrack (e.g., music that is played by default) with other audio that is customized for, or by, the viewer.

An analog system would require multiple audio tracks, one of which could be replaced (e.g. the music or the dialog in the default language) by user-chosen music or dialogue in another language. For example, in broadcast TV (broadcast analog signal), the transmission spectrum is wide enough to send two audio signals in addition to each video signal (i.e., the bandwidth required for an audio signal is much less than the bandwidth required for a video signal). Information indicating which audio signal is replaceable and the audio signal's characteristics (music, dialogue, etc.) could be sent with the analog signal in a vertical blanking interval (VBI) of the broadcast signal. The VBI is typically used for sending closed-captioning text information with analog TV broadcasts. The system of present invention interprets the information transmitted in the VBI, removes the default audio, and replaces the default audio with user-selected audio based on the analog system configuration using the methods previously described for replacing digital audio in a digital system. The replacement audio would then be mixed with the other audio track. The combination of the two analog audio signals is transmitted to the analog system speakers.

Variations, modifications, and other implementations of what is described herein may occur to those of ordinary skill in the art without departing from the spirit and scope of the invention. Accordingly, the invention is not to be defined only by the preceding illustrative description.

What is claimed is:

1. A method for customizing an audio portion of a digital program comprising:
   receiving the audio portion of the digital program as an audio data stream comprising multiplexed associated audio and data packets;
   selecting at least one of the audio packets to be replaced by replacement audio packets;
   creating an audio characteristics table for storing audio characteristics based on information from data packets corresponding to the selected audio packets that are to be replaced;
   creating a replacement audio table comprising information corresponding to said replacement audio packets;
   determining, in real time, whether a timestamp of said selected audio packets coincides within an interval specified in said replacement audio table;
   replacing the selected audio packets with the replacement audio packets thereby customizing the audio portion of the digital program during program playback, if the timestamp coincides within the interval specified in the replacement audio table; and
   otherwise, modifying audio characteristics of the replacement audio packets to match the audio characteristics of the selected audio packets according to the audio characteristic table and then replacing the selected audio packets with the replacement audio packets.

2. The method of claim 1 further comprising storing the plurality of audio packets in an audio buffer.

3. The method of claim 1 further comprising storing the replacement audio packet in a replacement audio buffer.

4. The method of claim 3 wherein replacing the at least one of the audio packets with the replacement audio packet comprises retrieving the replacement audio packet from the replacement audio buffer and multiplexing the replacement audio packet with the audio data stream.

5. The method of claim 1 wherein selecting at least one of the audio packets to be replaced comprises determining an audio packet program identifier from a program specific information table for the at least one of the audio packets to be replaced and storing the audio program identifier in an audio characteristic table.

6. The method of claim 1 further comprising identifying during playback of the digital video the at least one of the audio packets to be replaced by reading an audio program identifier from a header in the associated data packet.

7. The method of claim 1 further comprising retrieving the replacement audio packet from a DVD or CD.

8. The method of claim 1 further comprising demultiplexing the data stream to separate the plurality of associated audio and data packets.

9. A system for customizing an audio portion of a digital program comprising:
   a receiver interface for receiving the audio portion of the digital program as an audio data stream comprising multiplexed associated audio and data packets;
   a graphical user interface for selecting at least one of the audio packets to be replaced by replacement audio packets;
   a control system for creating an audio characteristics table for storing audio characteristics based on information from data packets corresponding to the selected audio packets that are to be replaced;
   the control system for creating a replacement audio table comprising information corresponding to said replacement audio packets and determining, in real time, whether a timestamp of said selected audio packets coincides within an interval specified in said replacement audio table;
   the control system for replacing the selected audio packets with the replacement audio packets thereby customizing the audio portion of the digital video during program playback, if the timestamp coincides within the interval specified in the replacement audio table; and
   the control system for modifying audio characteristics of the replacement audio packets to match the audio characteristics of the selected audio packets according to the audio characteristic table if the timestamp coincides within the interval specified in the replacement audio table and then replacing the selected audio packets with the replacement audio packets.

10. The system of claim 9 wherein the control system comprises random access memory and an audio processor.

11. The system of claim 9 further comprising a data storage means for storing the audio packets.

12. The system of claim 9 further comprising a data storage means for storing the replacement audio packet.

13. The system of claim 9 further comprising a demultiplexing means for demultiplexing the data stream to separate the associated audio and data packets.

14. A program storage device readable by a machine, tangibly embodying a program of instructions executable by the machine to perform method steps for customizing an audio portion of a digital program, the method steps comprising:
   receiving the audio portion of the digital video as an audio data stream comprising multiplexed associated audio and data packets;
   selecting at least one of the audio packets to be replaced by replacement audio packet;
   creating an audio characteristics table for storing audio characteristics based on information from data packets corresponding to the selected audio packets that are to be replaced;

creating a replacement audio table comprising information corresponding to said replacement audio packets;

determining, in real time, whether a timestamp of said selected audio packets coincides within an interval specified in said replacement audio table;

replacing the selected audio packets with the replacement audio packets thereby customizing the audio portion of the digital program during program playback, if the timestamp coincides within the interval specified in the replacement audio table; and otherwise, modifying audio characteristics of the replacement audio packets to match the audio characteristics of the selected audio packets according to the audio characteristic table and then replacing the selected audio packets with the replacement audio packets.

15. A method for customizing an audio portion of a transmitted analog program comprising:

receiving the audio portion of the transmitted analog program, the audio portion comprising a first audio signal and a second audio signal;

receiving information transmitted in a vertical blanking interval of the transmitted analog program, the information comprising which of the first audio signal and the second audio signal is replaceable and the replaceable audio signal's characteristics;

creating an audio characteristics table for storing audio characteristics based on the received information corresponding to the replaceable audio signal;

creating a replacement audio table comprising information corresponding to a user-selected audio signal;

determining, in real time, whether a timestamp of said replaceable audio signal coincides within an interval specified in said replacement audio table;

replacing the replaceable audio signal with the user-selected audio signal, if the timestamp coincides within the interval specified in the replacement audio table; and otherwise, modifying audio characteristics of the user-selected audio signal to match the audio characteristics of the replaceable audio signal according to the audio characteristic table and then replacing the replaceable audio signal with the user-selected audio signal.

16. The method of claim 15 further comprising mixing the user-selected audio signal with the remaining first or second audio signal.

17. The method of claim 16 further comprising transmitting the mixed user-selected audio signal and remaining first or second audio signal to a speaker.

18. A method for customizing an audio portion of a digital program comprising:

receiving a digital program comprising video, audio and data packets;

de-multiplexing the digital program to receive an audio portion of the digital program as an audio data stream comprising associated audio packets to be replaced by replacement audio packets and to receive data packets associated with said audio packets;

selecting, by a user, particular audio segments of said program to be replaced during playback with the replacement audio packets, said segments comprising said audio packets to be replaced by replacement audio packets;

creating an audio characteristics table for storing audio characteristics data based on information from the associated data packets corresponding to the audio segments that are to be replaced, said selecting including determining an audio packet program identifier (PID) from a program specific information table for the selected audio packets to be replaced and storing the audio program identifier in said audio characteristic table;

providing a replacement audio buffer for storing replacement audio packets;

reading, during playback of the digital program, an audio packet program identifier from a header in the associated data packet of the at least one of the audio packets to be replaced;

creating a replacement audio table comprising information corresponding to the replacement audio packets;

determining, in real time, whether a timestamp of said audio segments coincides within an interval specified in said replacement audio table;

modifying the audio characteristics of the replacement audio packets to match the audio characteristics of the audio segments according to the audio characteristics table if the timestamp does not coincide with the interval; and, replacing the at least one of the audio packets with a replacement audio packet thereby customizing the audio portion of the digital program during program playback, said replacing of the audio segments with the replacement audio packets comprises retrieving the replacement audio packets from the replacement audio buffer and multiplexing the replacement audio packets with the audio data stream.

* * * * *